US012767002B2

(12) United States Patent
Rahm et al.

(10) Patent No.: US 12,767,002 B2
(45) Date of Patent: Oct. 20, 2026

(54) ELECTRIC ENERGY DISSIPATING SYSTEM FOR A VEHICLE

(71) Applicant: Volvo Truck Corporation, Gothenburg (SE)

(72) Inventors: Fredrik Rahm, Hörby (SE); Tove Audhav, Landvetter (SE); Peter Tennevall, Malmö (SE)

(73) Assignee: Volvo Truck Corporation, Gothenburg (SE)

( * ) Notice: Subject to any disclaimer, the term of this patent is extended or adjusted under 35 U.S.C. 154(b) by 398 days.

(21) Appl. No.: 18/239,537

(22) Filed: Aug. 29, 2023

(65) Prior Publication Data

US 2024/0083300 A1 Mar. 14, 2024

(30) Foreign Application Priority Data

Sep. 14, 2022 (EP) .................................... 22195579

(51) Int. Cl.
*B60L 58/15* (2019.01)
*B60L 1/00* (2006.01)
*F04B 17/03* (2006.01)

(52) U.S. Cl.
CPC ............... *B60L 58/15* (2019.02); *B60L 1/003* (2013.01); *B60L 2210/40* (2013.01); *F04B 17/03* (2013.01)

(58) Field of Classification Search
CPC ................................ B60L 1/003; F04B 17/00
See application file for complete search history.

(56) References Cited

U.S. PATENT DOCUMENTS 9,897,366 B2 * 2/2018 Yahia ................... G05D 23/023
10,106,143 B2 * 10/2018 Ogawa ................ B60L 15/2045
10,570,827 B2 * 2/2020 Juretzek .................. F02C 7/268
10,883,482 B2 * 1/2021 Nemeth .................. F04B 35/04
2004/0194949 A1 * 10/2004 Ban ......................... B60L 58/33
165/61

(Continued)

FOREIGN PATENT DOCUMENTS

CA 2163170 A1 5/1996
DE 102016215426 A1 2/2018

OTHER PUBLICATIONS

Extended European Search Report for European Patent Application No. 22195579.2, mailed Mar. 3, 2023, 14 pages.

*Primary Examiner* — Brian L Swenson
(74) *Attorney, Agent, or Firm* — Sage Patent Group

(57) ABSTRACT

An electric energy dissipating system for a vehicle. The system includes an electric power system configured to be electrically connected to an electric traction motor of the vehicle and configured to receive and store electric power generated by the electric traction motor during braking, a fluid conduit, an air flow producing unit configured to provide a pressurized air flow through the fluid conduit, an electric machine, and a transmission arrangement. The electric machine is configured to be powered by the electric power system so as to drive the air flow producing unit via the transmission arrangement in order to dissipate energy from the electric machine. The transmission arrangement includes a first shaft and a second shaft. The first shaft is driven by the electric machine and the second shaft drives the air flow producing unit. The second shaft rotates at higher speed than the first shaft.

19 Claims, 5 Drawing Sheets

(56) References Cited

U.S. PATENT DOCUMENTS

| | | | | |
|---|---|---|---|---|
| 2010/0288571 | A1* | 11/2010 | Dewis | B60K 6/12<br>60/659 |
| 2011/0231047 | A1 | 9/2011 | Aixala et al. | |
| 2012/0201657 | A1 | 8/2012 | Donnelly et al. | |
| 2013/0133480 | A1 | 5/2013 | Donnelly | |
| 2014/0266038 | A1* | 9/2014 | Gibeau | B60L 15/20<br>320/109 |
| 2015/0073637 | A1 | 3/2015 | Lennevi et al. | |
| 2018/0298777 | A1* | 10/2018 | Nguyen | F02C 7/36 |
| 2023/0286395 | A1* | 9/2023 | Frament | B60L 1/003 |
| 2023/0303052 | A1* | 9/2023 | Gesang | B60W 30/18 |
| 2023/0392543 | A1* | 12/2023 | Colavincenzo | B60L 1/02 |
| 2024/0270075 | A1* | 8/2024 | Audhav | B60K 1/00 |

* cited by examiner

ELECTRIC ENERGY DISSIPATING SYSTEM FOR A VEHICLE

CROSS REFERENCE TO RELATED APPLICATION

This application claims foreign priority to European Application No. 22195579.2 filed on Sep. 14, 2022, the disclosure and content of which is incorporated by reference herein in its entirety.

TECHNICAL FIELD

The disclosure relates generally to an electric energy dissipating system. In particular aspects, the disclosure relates to an electric energy dissipating system for a vehicle. The disclosure can be applied in heavy-duty vehicles, such as trucks, buses, and construction equipment. Although the disclosure may be described with respect to a particular vehicle, the disclosure is not restricted to any particular vehicle.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power form hydrogen fuel cells have grown in popularity, in particular for trucks and other heavy-duty vehicles.

In comparison to a vehicle propelled solely by an internal combustion engine (ICE), a vehicle propelled by an electric machine conventionally struggles with obtaining the desired functionality of auxiliary braking. For an ICE operated vehicle, the auxiliary braking can be achieved by means of a retarder, etc. However, for an electric vehicle, the auxiliary braking functionality can be a dimensioning factor for the cooling system since the cooling capacity of, for instance, a fuel cell electric vehicle (FCEV) as well as battery electric vehicle (BEV) is a limiting factor. The reason is that for such type of vehicles, the auxiliary braking places a lot of energy in the cooling system.

It is therefore desirable to provide a solution which puts less strain to the vehicle cooling system.

SUMMARY

According to a first aspect of the disclosure, there is provided an electric energy dissipating system for a vehicle, the system comprising:

- an electric power system configured to be electrically connected to an electric traction motor of the vehicle and configured to receive and store electric power generated by the electric traction motor during braking,
- a fluid conduit,
- an air flow producing unit configured to provide a pressurized air flow through the fluid conduit,
- an electric machine,
- a transmission arrangement,
- wherein the electric machine is configured to be powered by the electric power system so as to drive the air flow producing unit via the transmission arrangement in order to dissipate energy from the electric machine,
- wherein the transmission arrangement comprises a first shaft and a second shaft, wherein the first shaft is connected to and configured to be driven by the electric machine and the second shaft is connected to and configured to drive the air flow producing unit, wherein the transmission arrangement is configured such that the second shaft rotates at higher speed than the first shaft. The first aspect of the disclosure may seek to reduce problems relating to insufficient battery capacity for receiving energy supplied from regenerative braking, e.g. during downhill travel. A technical benefit may include that the electric energy dissipating system may, by using an air flow producing unit, reduce the battery state of charge to provide for sufficient battery capacity, for example for future brake events. By providing a transmission arrangement between the air flow producing unit and the electric machine that drives the air flow producing unit, an increased power (rate of electrical consumption of the air flow producing unit) and improved energy dissipation is achieved.

In some examples, said transmission arrangement has a variable transmission ratio. A technical benefit may include that by varying the transmission ratio, the energy dissipation can be controlled in an efficient manner, while allowing for a simple control of the electric machine. For instance, a variable transmission ratio may allow the electric machine to be operated at a constant speed which is selected based on a certain power level of the flow producing unit, thereby enabling high efficiency operation.

In some examples, said transmission arrangement comprises a gearbox with gears for transmitting the rotation of the first shaft to a rotation of the second shaft. A technical benefit may include that gear provides a robust transmission between shafts. In this connection it should be understood that the gearbox may in some examples have a fix gear ratio, while in other examples the gearbox may have two or more selectable gear ratios (i.e. a variable transmission ratio).

In some examples, said gearbox comprises an intermediate shaft, wherein said first shaft is via a first gear connected to said intermediate shaft such that said intermediate shaft rotates at higher speed than said first shaft, wherein said intermediate shaft is via a second gear connected to said second shaft such that said second shaft rotates at higher speed than said intermediate shaft. A technical benefit may include increased freedom of design, and increased flexibility in selecting gear dimensions (e.g. gear wheel size). For instance, rather than having one large gear interconnecting the first and second shaft, two smaller gears and the intermediate may shaft be provided which may result in a more convenient and less bulky solution for obtaining the same gear ratio.

In some examples, the electric energy dissipation system further comprises an oil pump configured to feed oil to the gears for lubricating and cooling the gears. A technical benefit may include that large amount of heat energy produced by the transmission arrangement can be taken up by the oil, and prolong the lifetime of the transmission arrangement. Furthermore, the oil may create a film which can carry gear cogs (functioning similarly to hydroplaning) and reduces friction. The fed oil may also lubricate and cool bearings included in the gearbox.

In some examples, the electric energy dissipation system further comprises an oil circuit in which the oil fed by the oil pump is circulated, wherein the oil circuit comprises a heat exchanger arrangement located downstream of the gears, wherein oil heated by the gears becomes cooled when passing along the heat exchanger arrangement before being recirculated to the gears. A technical benefit may include that temperature of the transmission arrangement can be effectively kept at an acceptable temperature. In some examples, the heat exchanging medium may be inlet air to the air flow producing unit. This may be beneficial as it does not require a separate cooling medium, but makes use of the existing medium (air). For instance, an air pipe section with cooling fins may be provided upstream of the air flow producing unit. The oil circuit may be arranged in contact with and guided along such fins so as to dissipate heat from the oil via the fins to the inlet air. The fins and/or the pipe part may suitably be of a good heat conducting material, such as aluminum. In some examples, a separate heat exchanger with a cooling medium may be used for taking up the heat from the oil. Such a cooling medium may suitably be a liquid medium. However, in some examples the cooling medium of the heat exchanger may be air.

In some examples, the transmission arrangement comprises a continuously variable transmission (CVT) for allowing seamless change of transmission ratios. A technical benefit may include that a CVT allows for a more flexible and accurate control of the energy dissipation from the electric machine. The electric machine may operate at a constant speed (constant RPM) while the CVT is controlled so as to control the speed of the air flow producing unit. This is beneficial as it allows for a low-cost electric machine to be used. The CVT may for example be a pulley CVT, which includes a belt or a chain which runs between variable diameter pulleys. Other examples of conceivable CVTs, are toroidal CVTs, cone CVTs, epicyclic CVTs or hydrostatic CVTs.

In some examples, the electric energy dissipating system further comprises a throttle located at an air intake of the air flow producing unit, wherein the throttle is adjustable to control the intake pressure of the air entering the air flow producing unit, and thereby the power of the air flow producing unit. A technical benefit may include that is allows for a fixed gear ratio to be provided by the transmission, while still enabling an adjustment of the energy dissipation. By adjusting the throttle setting, the density of the air is changed. This may be suitably adapted to, for instance, a desired braking power.

In some examples, the electric energy dissipating system further comprises a control unit configured to control the amount of energy dissipated from the electric machine by controlling the electric power provided to the electric machine and/or by controlling the transmission ratio of the transmission arrangement and/or by controlling a flow-through area of the throttle. Thus, there may be at least three adjustable features that the control unit may control. A technical benefit may include that the control unit, based on an energy dissipation request, may control the energy dissipation by controlling one or more of said features. In some examples, the electric energy dissipating system may be configured to control only one of said three features (e.g. if the transmission ratio is not variable, this will not be controlled), while in other examples, the control unit may be configured to control two or three of said features. In some examples, the control unit may be configured to control two or three of said features simultaneously, for example controlling the throttle simultaneously with controlling the transmission arrangement.

The herein described control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

In some examples, the electric power system comprises a battery for storing regenerated electric energy, wherein the control unit is configured to acquire information indicating the state of the battery, such as state of charge, temperature and/or power, wherein the control unit is configured to control the power provided to the electric machine and/or the transmission ratio of the transmission arrangement and/or the flow-through area of the throttle based on the acquired information indicating the state of the battery. A technical benefit may include that by providing information to the control unit regarding the state of the battery, energy dissipation may be activated irrespective of a current brake event occurring or not. Thus, the control unit may control the electric power system to supply battery power to the electric machine in order to dissipate energy based on the current state of the battery. In addition, as indicated above, the control unit may control the level of energy dissipation by adjusting the speed of the electric machine and/or the transmission ratio of the transmission arrangement and/or the flow-through area of the throttle.

It should be understood that in any example of this disclosure, instead of having a speed-based control of the electric machine, another alternative is to have a torque-based control of the electric machine. In practice, it is possible to control for speed or torque to obtain the correct current and thereby the correct power. Thus, a torque request or a speed request can both be recalculated into a current to be provided to the electric machine.

In some examples, the control unit is connected to the electric power system and the electric machine, wherein the control unit is configured to:

receive information indicating a brake request, and based on said received information indicating a brake request, control the electric power system to power the electric machine. A technical benefit may be that depending on the requested magnitude of the braking action, the level of electric power provided to the electric machine may be appropriately selected.

In some examples, the electric power system comprises an inverter which converts a DC input into an AC output, wherein the electric machine is electrically connected to the inverter, wherein the control unit is configured to, based on said information indicating a brake request, activate the inverter to provide power to the electric machine. A technical benefit may include that DC battery power may effectively be converted into AC power for powering the electric machine. It should be understood that the control unit may suitably control the inverter in such way that it provides the desired current to the electric machine so as to obtain the speed/torque the meets the desired power.

In some examples, the control unit is connected to the electric power system and the electric machine, wherein the control unit is configured to:

receive, from the electric power system, information indicating a current energy dissipation request from the electric power system, and based on said received information indicating a current energy dissipation request, control the electric power system to power the electric machine and/or control the transmission ratio of the transmission arrangement and/or control the flow-through area of the throttle. A technical benefit may include that the control unit may control the operation of the electric power system to power the electric machine when the control unit has been notified of a request to dissipate energy from the electric power system. It should be understood that an energy dissipation request may be made independently of a brake request. For instance, an energy dissipation request may be received at standstill, at loading, at idling, or just prior to a brake request, etc. Furthermore, as indicated above, the control unit may adjust the energy level that is to be dissipated by appropriately controlling the power provided to the electric machine (i.e. controlling the speed and/or torque of the electric machine) and/or controlling the transmission ratio of the transmission arrangement and/or controlling the flow-through area of the throttle. In some examples, in which the electric power system comprises an inverter which converts a DC input into an AC output, wherein the electric machine is electrically connected to the inverter, the control unit may be configured to, based on said information indicating a current energy dissipation request, activate the inverter to provide power to the electric machine.

In some examples, said current energy dissipation request is based on a desired energy level of the electric power system at an upcoming driving position for the vehicle, wherein before the vehicle arrives at the upcoming driving position, the control unit is configured to control the power provided to the electric machine and or control the transmission ratio of the transmission arrangement and/or control the flow-through area of the throttle. Thus, based on the upcoming driving position, such as an upcoming driving situation, based on e.g. speed limits, altitude, etc. the control unit may determine the level of energy that will be obtained by the electric power system at the upcoming driving position. A technical benefit may include that the energy dissipation may be made before the vehicle arrives at the upcoming driving position and the electric power system is thus able to receive electric power when the vehicle arrives at said upcoming driving position. The energy dissipation may thus be made in advance to enable for example a battery of the electric power system to receive electric power. In some examples, the control unit may be configured to acquire look-ahead data for predicting upcoming brake events, and be configured to control the power level provided to the electric machine and/or the transmission ration of the transmission arrangement and/or the flow-through area of the throttle based on the look-ahead data.

In some examples, said electric traction motor is a first electric traction motor, wherein said electric machine is a second electric traction motor electrically connected to the electric power system, wherein upon braking of the vehicle, the second electric traction motor is configured to drive the air flow producing unit in order to dissipate at least a part of the electric energy that is generated by the first electric traction motor during the braking. A technical benefit may include that there is no need to provide a separate electric machine for achieving the desired energy dissipation. Rather, one of the electric traction motors, may temporarily be used as said electric machine. It should be understood that in some examples, the vehicle may have more than two traction motors, for example three traction motors, wherein one of said traction motors may temporarily be coupled to function as said electric machine to drive the air flow producing unit.

In some examples, both the first electric traction motor and the second electric traction motor are configured to be coupled to a vehicle gearbox to provide traction force to road wheels of the vehicle, wherein the control unit is configured to decouple the second electric traction motor from the vehicle gearbox and control the second electric traction motor to drive the air flow producing unit and thus dissipating at least part of the electric energy that is generated by the first electric traction motor which is still coupled to the vehicle gearbox. A technical benefit may include that the second traction motor may conveniently have two functions, the traction function and an energy dissipating function, and that the control unit may couple or decouple the second electric traction motor depending on the presently desired function. There may suitably also be a coupling between the second electric traction motor and the first shaft so that the control unit may control the second electric traction motor to become coupled to the first shaft when the second electric motor becomes decoupled from the vehicle gearbox, and vice versa. Energy may suitably be used from a battery of the electric power system or from the first electric traction motor in generator mode to energize the first electric traction motor.

In some examples, the air flow producing unit is an air compressor configured to compress the received air and transmit the compressed air along the fluid conduit. A technical benefit may include that an air compressor can be provided as a relatively small component fulfilling the desires of creating sufficient increase in pressure and mass flows. An air compressor is also consuming relatively high level of power when compressing the air, thus improving the energy dissipation. In some examples, the air flow producing unit may be another type of unit arranged to receive and blow air through the fluid conduit. For instance, in some examples, the air flow producing unit may be a fan.

From the above discussion and the following discussion, it should be understood that the present electric energy dissipating system may thus advantageously "burn off" electric energy for performing a braking operation of the vehicle, whereby the electric energy gained during such an event is placed into a raised temperature of air which may be passed to the ambient. The teachings of the present disclosure are particularly advantageous when for example a vehicle battery is full and the cooling system has reached its limit, i.e. the cooling system is unable to provide any cooling. A further advantage is thus that existing cooling systems may be downsized.

According to a second aspect of the disclosure, there is provided a vehicle in the form of a battery electric vehicle (BEV) or a fuel cell electric vehicle (FCEV), the vehicle comprising the electric energy dissipating system according to the first aspect, including any example thereof. The second aspect of the disclosure may seek to solve the corresponding problem as the first aspect, including any example thereof. A technical benefit may include the technical benefit discussed in connection with the first aspect, including any example thereof.

In some examples, some of the air received by the air flow producing unit may also be guided to the electric machine in order to cool the electric machine. A technical benefit may include that the a simple yet effective way of cooling the electric machine is achieved.

In some examples, the air flow producing unit may include liquid (such as water) injection. A technical benefit may include that the mass flow of the pressurized air flow is increased, thereby enabling a high pressure to be provided by the air flow producing unit, while the temperature of the air flow may be reduced. An air flow having a reduced temperature may be used for cooling other components, such as brakes or the electric machine.

In some examples, the electric machine and the gearbox may be noise-insulated. A technical benefit may include that the risk of disturbing the driver when the energy dissipating function of the system is active, is reduced.

In some examples, the electric energy dissipating system comprises an air flow restriction arrangement located downstream of the air flow producing unit. A technical benefit may include that the restriction creates a higher pressure in the air flow producing unit. For a compressor, for instance, this enables the compressor to be in a better position in the compressor map.

In some examples, the electric energy dissipating system comprises a muffler located downstream of the air flow producing unit. A technical benefit may include that it reduces the noise from the system.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Figure 1:
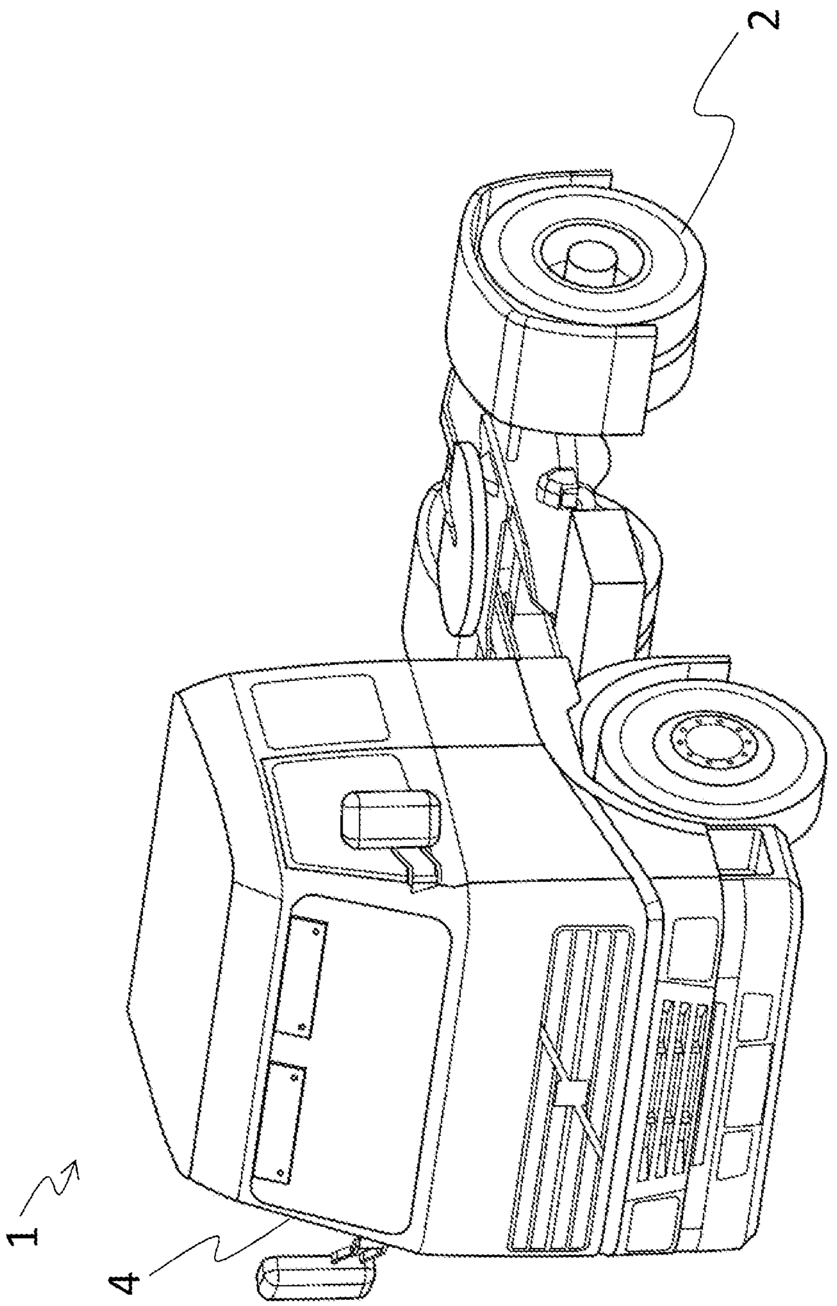
FIG. 1 illustrates an exemplary vehicle in which an electric energy dissipating system according to the present disclosure may be implemented.

Aspects set forth below represent the necessary information to enable those skilled in the art to practice the disclosure.

As explained previously, for an electric vehicle, the auxiliary braking functionality can be a dimensioning factor for the cooling system since the cooling capacity is a limiting factor, and since the auxiliary braking places a lot of energy in the cooling system. It may therefore be desirable to dissipate energy so that upon subsequent brake events, the electric energy gained during braking operation can be appropriately handled. For instance, when a vehicle battery is full and the cooling system has reached its limit, i.e. the cooling system is unable to provide any cooling, then it may be desirable to dissipate electric energy.

The inventors have realized that an electric machine which drives an air flow producing unit may be used to dissipate energy. The air flow producing unit will turn the dissipated energy into heat and the hot air may be dispensed to the ambient. In particular, the inventors have realized that by providing a transmission arrangement which causes the air flow producing unit to rotate at a higher speed than the electric machine, the energy dissipation can become very efficient. The transmission arrangement achieves an increased power usage of the flow producing unit and thereby an increased energy dissipation.

In the following, like reference numerals refer to like elements throughout the description.

FIG. 1 illustrates an exemplary vehicle 1 in which an electric energy dissipating system according to the present disclosure may be implemented. In this example, the vehicle 1 is a heavy-duty vehicle in the form of a tractor unit. The tractor unit may be powered by a fuel cell system. The vehicle 1 may thus be a fuel cell electric vehicle (FCEV). Alternatively, the tractor unit may be powered by an electric battery, i.e. the vehicle 1 may thus be a battery electric vehicle (BEV). The vehicle 1 comprises an electric traction motor (not illustrated) for propelling the road wheels 2 of the vehicle 1. The electric traction motor may thus receive electric power from a traction battery (in case of a BEV) or directly from a fuel cell system (in case of an FCEV). An electric power system of the electric energy dissipating system may thus be connected to the electric traction motor. Although a tractor unit has been illustrated, it should be understood that the teachings of the present disclosure may also be implemented in other types of vehicles, such as busses, construction equipment and passenger cars. The illustrated vehicle 1 comprises a cabin 4 in which a driver may operate the vehicle 1. However, in other exemplary embodiments the vehicle 1 may be an autonomous, i.e. self-driving, vehicle.

Figure 2:
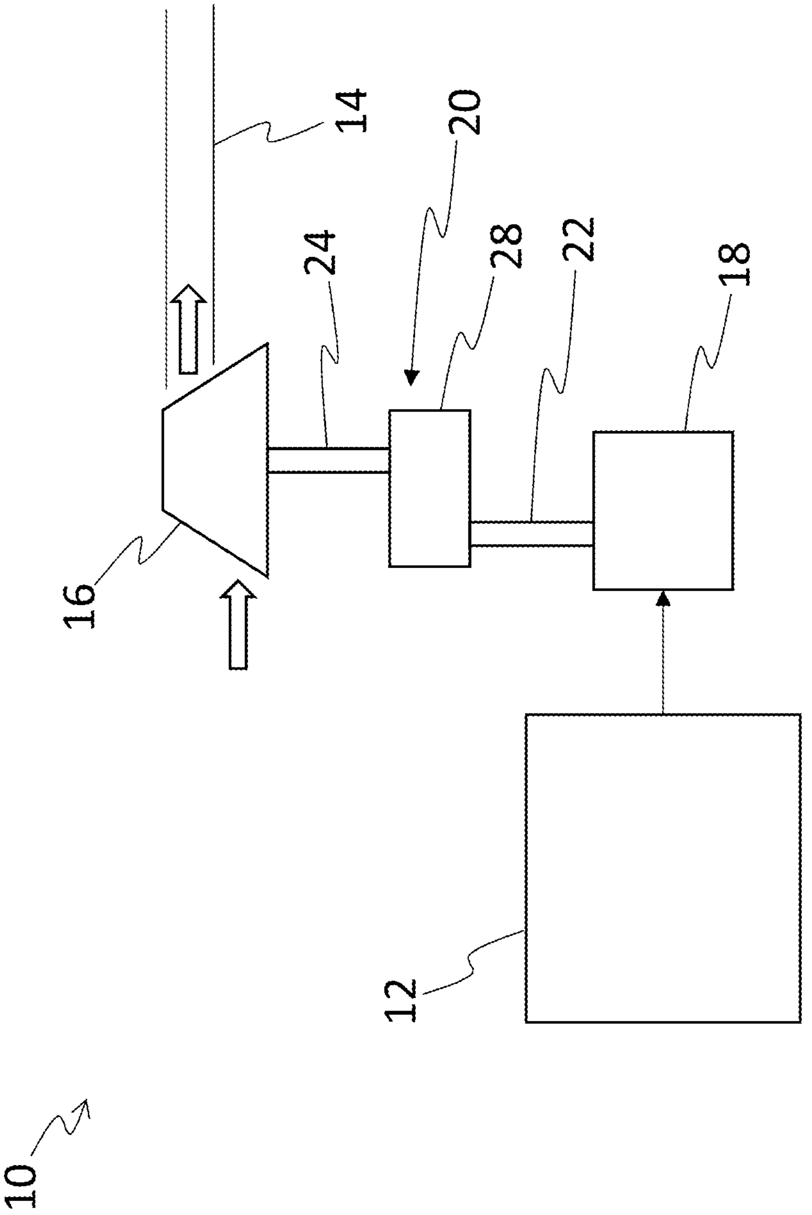
FIG. 2 is a schematic illustration of an electric energy dissipating system according to at least one example of the present disclosure.

FIG. 2 is a schematic illustration of an electric energy dissipating system 10 according to at least one example of the present disclosure. The illustrated electric energy dissipating system 10 may, for instance, be provided in a vehicle such as the one illustrated in FIG. 1. The electric energy dissipating system 10 illustrated in FIG. 2 comprises:

- an electric power system 12 configured to be electrically connected to an electric traction motor (not illustrated) of the vehicle and configured to receive and store electric power generated by the electric traction motor during braking,
- a fluid conduit 14,
- an air flow producing unit 16 configured to provide a pressurized air flow through the fluid conduit 14,
- an electric machine 18,
- a transmission arrangement 20,
- wherein the electric machine 18 is configured to be powered by the electric power system 12 so as to drive the air flow producing unit 16 via the transmission arrangement 20 in order to dissipate energy from the electric machine 18,
- wherein the transmission arrangement 20 comprises a first shaft 22 and a second shaft 24, wherein the first shaft 22 is connected to and configured to be driven by the electric machine 18 and the second shaft 24 is connected to and configured to drive the air flow producing unit 16, wherein the transmission arrangement 20 is configured such that the second shaft 24 rotates at higher speed than the first shaft 22.

The air flow is illustrated by block arrows into and out of the air flow producing unit 16. Although the air flow producing unit 16 in FIG. 2 has been illustrated with a compressor symbol, it should be understood that this is just one example of an air flow producing unit 16. There are other conceivable examples or air flow producing units, such as for instance, a fan.

From the above, it should be clear that the electric machine 18 is mechanically connected to the air flow producing unit 16 via the transmission arrangement 20. The transmission arrangement 20 may have a fixed transmission ratio or a variable transmission ratio. In case of a variable transmission ratio, the transmission arrangement may comprise a gearbox with gears for transmitting the rotation of the first shaft 22 to a rotation of the second shaft 24, or the transmission arrangement may comprise a continuously variable transmission (CVT) for allowing seamless change of transmission ratios. Thus, in FIG. 2, the schematic component indicated by reference numeral 28 may either represent a gearbox or a CVT.

The electric power system 12 may be configured to convert an incoming alternating current from the electric traction motor into a direct current. The regenerative electric energy received through such braking may be storable in the electric power system 12. The electric power system 12 may in turn be used for powering the electric machine 18 in order to dissipate electric energy. To this end the electric power system 12 may suitable convert a DC input into an AC output to power the electric machine 18.

Figure 3:
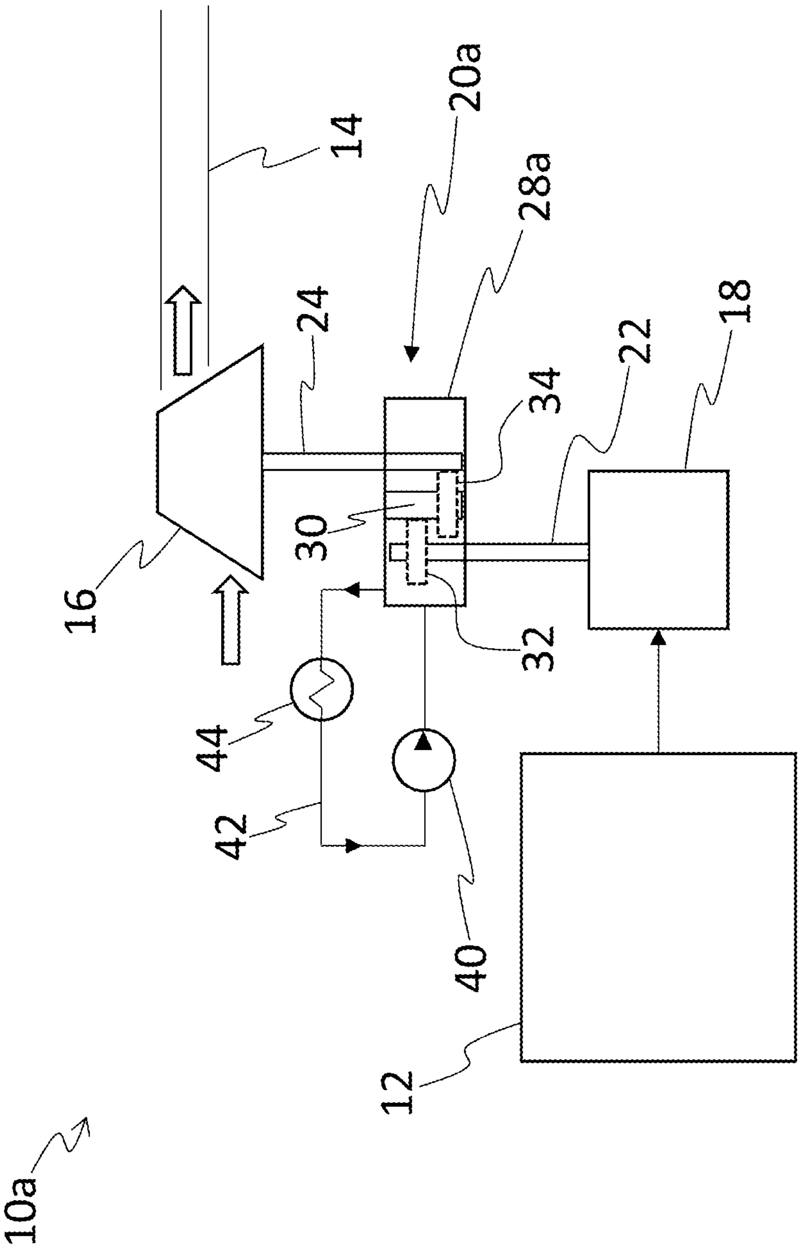
FIG. 3 is a schematic illustration of an electric energy dissipating system according to at least another example of the present disclosure.

FIG. 3 is a schematic illustration of an electric energy dissipating system 10*a* according to at least another example of the present disclosure. FIG. 3 is slightly more detailed compared to FIG. 2 and includes additional components. FIG. 3, illustrates that the transmission arrangement 20*a* may, in at least some examples, comprise a gearbox 28*a* which comprises an intermediate shaft 30. The first shaft 22 is via a first gear 32 connected to the intermediate shaft 30 such that said intermediate shaft 30 rotates at higher speed than the first shaft 22. The first gear 32 may, for instance, be provided circumferentially around the first shaft 22 and rotate with the first shaft 22, in particular rotate with the same speed as the first shaft 22. Gear cogs of the first gear 32 may come into engagement with mating cogs, or similar projecting structures, on the intermediate shaft 30. Purely as an illustrative example, the gear ratio between the first shaft 22 and the intermediate shaft 30 may be selected so that the speed of the intermediate shaft 30 is in the range of 3-5 times as high as the speed of the first shaft 22, for example 4 times the speed of the first shaft 22. In its turn, the intermediate shaft 30 is via a second gear 34 connected to the second shaft 24 such that the second shaft 24 rotates at higher speed than the intermediate shaft 30. The second gear 34 may, for instance, be provided circumferentially around the intermediate shaft 30 and rotate with the intermediate shaft 30, in particular rotate with the same speed as the intermediate shaft 30. Gear cogs of the second gear 34 may come into engagement with mating cogs, or similar projecting structures, on the second shaft 24. Again, purely as an illustrative example, the gear ratio between the intermediate shaft 30 and the second shaft 24 may be selected so that the speed of the second shaft 24 is in the range of 3-5 times as high as the speed of the intermediate shaft 30, for example 4 times the speed of the intermediate shaft 30. It is emphasized that the above numbers are just some examples, and it should be understood that other gear ratios may be selected. Furthermore, it should be understood that although only one intermediate shaft 30 has been illustrated, it would be conceivable to include further intermediate shaft(s) and further gear(s), for instance depending on the desired or available dimension for the gearbox 28*a* and the desired transmission ratio. Furthermore, the gearbox 28*a* may include different gears, to allow for changing gear ratios based on the amount of energy that is to be dissipated.

FIG. 3 also illustrates that in some examples, the electric energy dissipating system 10*a* may comprise an oil pump 40 configured to feed oil to the gears 32, 34 for lubricating and cooling the gears 32, 34. Although the oil pump 40 has been illustrated in the same drawing figure as the transmission arrangement 28*a* having the intermediate shaft 30, it should be understood that such an oil pump 40 may be implemented for other examples of the transmission arrangement 20*a*, for lubricating and cooling the gears therein. For instance, such another example may be a transmission arrangement in which there is only one gear wheel interconnecting the first shaft 22 with the second shaft 24, without an intermediate shaft. Furthermore, it should be understood that the oil fed from the oil pump 40 may also be used for lubricating and cooling bearings included in the gearbox 28*a*.

As illustrated in FIG. 3, the electric energy dissipating system 10*a* may comprise an oil circuit 42 in which the oil fed by the oil pump 40 is circulated. The oil circuit 42 may comprise a heat exchanger arrangement 44 located downstream of the gears, in particular downstream of the gearbox 28*a*. Oil heated by the gears 32, 34 become cooled when passing along the heat exchanger arrangement 44 before being recirculated to the gears 32, 34 by the oil pump 40. The heat exchanger arrangement 44 may, at least in some examples, comprise a traditional separate cooling medium circuit wherein the cooling medium takes up the heat from the heated oil via a separating wall. However, in at least some other examples, the cooling medium may be the inlet air to the air flow producing unit 16. The inlet air may flow on the inside of a passage wall, wherein the inlet air may take up heat (via the passage wall) from the oil passing along the outside of the passage wall.

Figure 4:
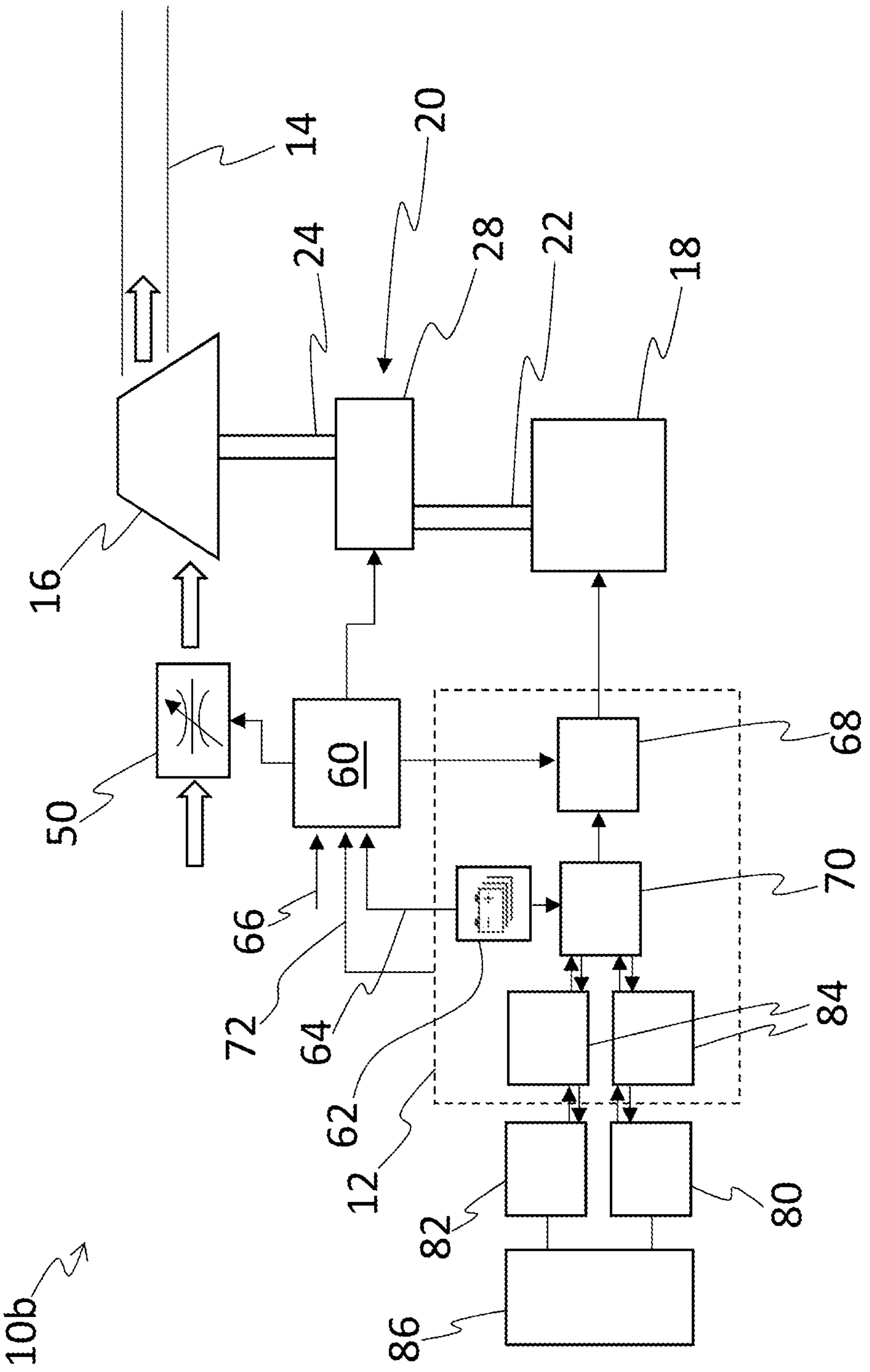
FIG. 4 is a schematic illustration of an electric energy dissipating system according to at least yet another example of the present disclosure.

FIG. 4 is a schematic illustration of an electric energy dissipating system 10*b* according to at least yet another example of the present disclosure. Although the oil pump 40 and the oil circuit 42 discussed in FIG. 3 is not illustrated in FIG. 4 it should be understood that such an oil circuit with an oil pump (and heat exchanger arrangement) may be readily implemented also for the example illustrated in FIG. 4. In this example of an electric energy dissipating system 10*b*, it is illustrated that the electric energy dissipating system 10*b* may comprise a throttle 50 located at an air intake of the air flow producing unit 16. The throttle 50 may be adjustable to control the intake pressure of the air entering the air flow producing unit 16, and thereby the power of the air flow producing unit 16. In particular, a flow-through area of the throttle 50 may be adjusted, either by increasing or decreasing said flow-through area. It should be understood that the throttle 50 may readily be implemented in other examples as well, such as those illustrated in FIG. 2 and FIG. 3.

FIG. 4 further illustrates that the electric energy dissipating system 10*b*, may comprise a control unit 60 configured to control the amount of energy dissipated from the electric machine 18 by controlling the electric power provided to the electric machine 18. Such a control unit 60 may, of course, also be implemented in other examples of the electric energy dissipating system, such as those illustrated in FIG. 2 and FIG. 3. The control unit 60 may suitably control how much power the electric power system 12 should deliver to the electric machine 18, thereby controlling the rotational speed/torque of the electric machine 18, and thereby controlling the amount of energy dissipated from the electric machine 18 and the electric power system 12. More specifically, the control unit 60 may control an inverter 68 of the power system 12 in order to adjust how much power that is delivered to the electric machine 18.

In examples in which the transmission arrangement 20 has a variable transmission ratio, the control unit 60 may be configured to control energy dissipation by appropriately adjusting the transmission ratio of the transmission arrangement 20. By changing the transmission ratio, the magnitude of the energy dissipation can be changed.

Furthermore, in at least some examples, the control unit 60 may be configured to control the energy dissipation by controlling the flow-through area of the throttle 50. By changing the flow-through area, the magnitude of the energy dissipation can be changed.

The electric energy dissipating system 10*b* may suitably comprise a battery 62 for storing regenerated electric energy. In particular, the electric power system 12 may comprise said battery 62. For instance, the regenerative electric energy received through braking may be stored in the battery 62 if the present state of charge and capacity of the battery allow such storage. The control unit 60 may be configured to acquire information 64 indicating the state of the battery 62. The state of the battery 62 may include its state of charge, temperature and/or power. Based on the acquired information 64 indicating the state of the battery 62, the control unit 60 may be configured to control power provided to the electric machine 18 and/or the transmission arrangement 20 and/or the throttle 50, similarly to the above discussion. Thus, when the control unit 60 receives information 64 that the state of the battery (for example the state of charge or temperature are too high) it may initiate an energy dissipating process by starting the electric machine 18 so that it drives the air flow producing unit 16. In particular, the control unit 60 may control the electric power system 12 to provide power to the electric machine 18 to start the electric machine. Depending on which components that are included in the specific example, the control unit 60 may adjust the magnitude of energy dissipation by adjusting the power provided to the electric machine 18, the transmission ratio of the transmission arrangement 20, and/or the flow-through area of the throttle 50.

The control unit 60 may be connected to the electric power system 12 and the electric machine 16, and may be configured to receive information 66 indicating a brake request. Based on said received information 66 indicating a brake request, the control unit 60 may control the electric power system 12 to power the electric machine 18. Furthermore, based on the desired braking power, the control unit 60 may adjust the speed of the electric machine 18, the transmission ratio of the transmission arrangement 20 and/or the flow-through area of the throttle 50, so as to achieve an energy dissipation that matches the desired braking power. In this way, the state of the battery 62 may be kept under control, reducing the risk of overcharging or overheating the battery 62 during a brake event.

As mentioned above, the electric power system 12 may suitably comprise the inverter 68. The inverter 68 converts a DC input into an AC output, wherein the electric machine 18 is electrically connected to the inverter 68, wherein the control unit 60 is configured to, based on said information 66 indicating a brake request (or based on the information 64 concerning the state of the battery 62), activate the inverter 68 to provide power to the electric machine 18. The control unit 60 may also control the inverter 68 to adjust the power to the electric machine 18. Furthermore, the control unit may control the inverter 68 to provide and adjust the power to the electric machine 18 in response to other requests than a brake request, such as in response to a general energy dissipation request. The electric power system 12 may also comprise a junction box 70 which is electrically connected to the battery 62 and the inverter 68.

It should be understood that the control unit 60 may be configured to receive, from the electric power system 12, information 72 indicating a current energy dissipation request from the electric power system 12, and based on that, control the electric power system 12 to power the electric machine 18. In particular, the control unit 60 may be configured to control the energy dissipation so that it meets the current energy dissipation request by adjusting the speed of the electric machine 18, the transmission ratio of the transmission arrangement 20 and/or the flow-through area of the throttle 50. It should be understood, that the electric machine 18 may already be running due to a previous energy dissipation request, wherein the control unit 60 upon receipt of new and different energy dissipation request, may adjust the speed of the electric machine 18, or maintain the speed of the electric machine 18 while adjusting the flow-through area of the throttle 50 or the transmission ratio of the transmission arrangement 20, or adjusting two or more of these three features.

In at least some examples, said current energy dissipation request is based on a desired energy level of the electric power system 12 at an upcoming driving position for the vehicle. Therefore, before the vehicle arrives at the upcoming driving position, the control unit 60 may adjust the power provided to the electric machine 18 and or adjust the transmission ratio of the transmission arrangement 20 and/or adjust the flow-through area of the throttle 50.

Although the three features speed/torque of the electric machine 18, transmission ratio of the transmission arrangement 20, and flow-through area of the throttle 50 are discussed as being controllable by the control unit 60, it should be understood that in examples of the electric energy dissipating system in which one of the features is not included (for example not variable transmission, i.e. fixed transmission ratio), then the control unit 60 may still be configured to control one or both of the other features. It should also be understood that the control unit 60 may be programmed to find an efficient balance between the different control features, and may thus be configured to adjust two or three control features at substantially the same time. It should furthermore be understood that the control unit 60 may be implemented in other examples as well, such as those illustrated in FIG. 2 and FIG. 3, and may have other or additional control functions, such as controlling the operation of the oil pump 40 in the example in FIG. 3.

Continuing with FIG. 4, it is illustrated that the electric power system 12 is connected to two electric traction motors 80, 82. However, it should be understood that in other examples, the electric power system 12 may be connected to only one electric traction motor, or to more than two, such as three electric traction motors. More specifically, the electric power system comprises inverters 84 for converting the AC power generated by the electric traction motors 80, 82 upon regenerative braking, into DC power. These inverters 84 may therefore be referred to as “traction inverters”, while the inverter 68 between the junction box 70 and the electric machine 18 may be referred to as a “brake inverter”.

Figure 5:
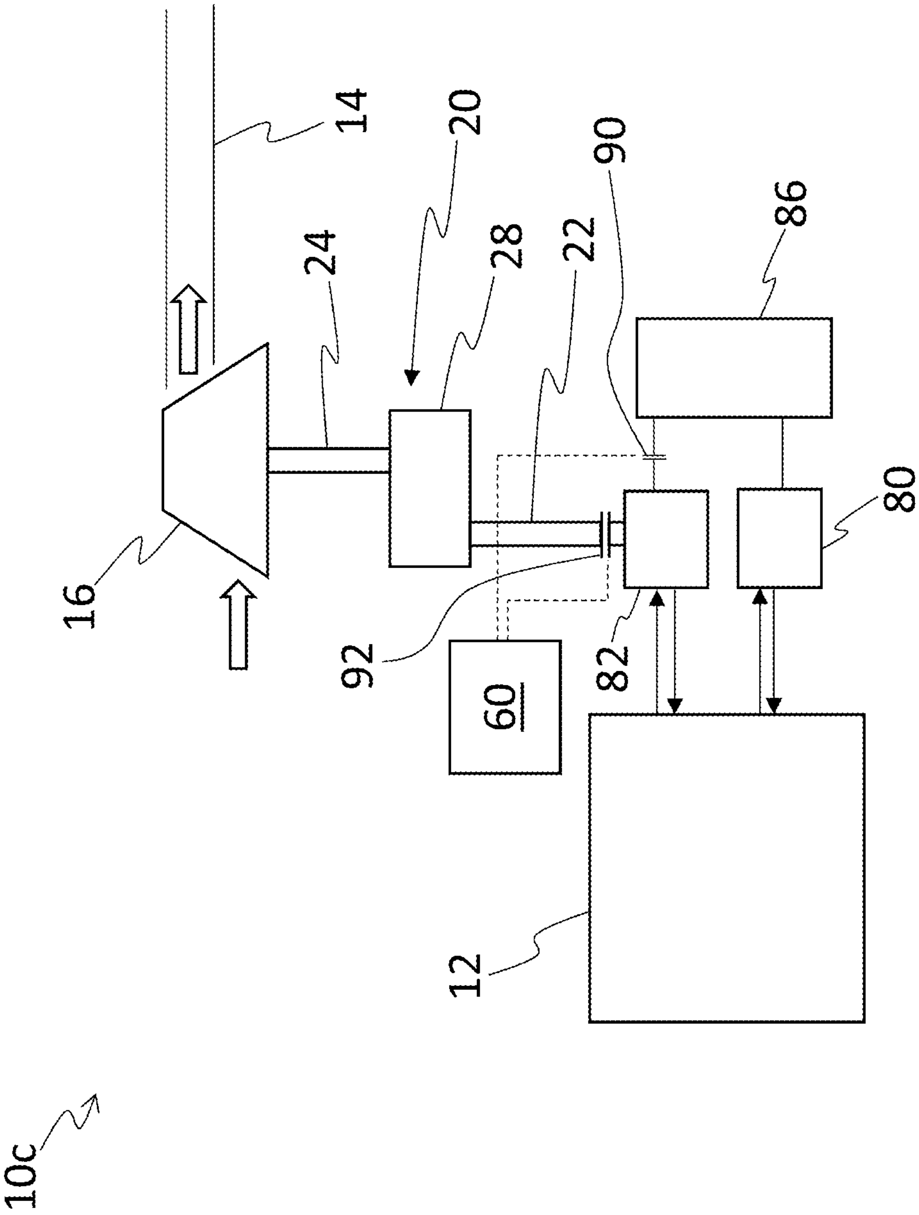
FIG. 5 is a schematic illustration of an electric energy dissipating system according to a further example of the present disclosure.

FIG. 5 is a schematic illustration of an electric energy dissipating system 10*c* according to a further example of the present disclosure. It illustrates that in at least some examples, instead of having a separate electric machine 18, one of the electric traction motors 80, 82 may be temporarily used as an electric machine and be operatively connectable to the transmission arrangement 20. Thus, in at least some examples, there is a first electric traction motor 80, and an electric machine is a second electric traction motor 82 electrically connected to the electric power system 12, wherein upon braking of the vehicle, the second electric traction motor 82 is configured to drive the air flow producing unit 16 in order to dissipate at least a part of the electric energy that is generated by the first electric traction motor 80 during the braking. In such an example, both the first electric traction motor 80 and the second electric traction motor 82 are configured to be coupled to a vehicle gearbox 86 to provide traction force to road wheels of the vehicle, wherein the control unit 60 is configured to decouple the second electric traction motor 82 from the vehicle gearbox 86 and control the second electric traction motor 82 to drive the air flow producing unit 16 and thus dissipating at least part of the electric energy that is generated by the first electric traction motor 80 which is still coupled to the vehicle gearbox 86.

The illustration in FIG. 5 is a very general schematic example. It should, however, be understood that the idea of decoupling one of the electric traction motors may be implemented in other examples as well, such as in an energy dissipating system comprising the components illustrated in FIG. 3 and/or FIG. 4, and in other examples. Thus, it should be understood that in FIG. 5 only some of the components of the previous examples have been included for simplicity, however, as mentioned above, other components from other examples can readily be included also in this electric energy dissipating system 10*c*. FIG. 5 illustrates that the control unit 60 may control a coupling 90 to selectively couple or decouple the second electric traction motor 82 to the vehicle gearbox 86, and another coupling 92 to selectively couple or decouple the second traction motor 82 to the first shaft 22. Thus, when the coupling 90 is active so that second electric traction motor 82 is coupled to the vehicle gearbox 86, while the other coupling 92 is inactive (i.e. second electric traction motor 82 is mechanically decoupled from the first shaft 22), then the second electric traction motor 82 may perform its normal function of a traction motor/generator, similarly to the first electric traction motor 80. However, when the coupling 90 is inactive (i.e. second electric traction motor 82 is mechanically decoupled from the vehicle gearbox 86), while the other coupling 92 is active (i.e. second electric traction motor 82 is mechanically coupled to the first shaft 22), then the second electric traction motor 82 may function as an electric machine in order to drive the air flow producing unit so as to dissipate electric energy.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. An electric energy dissipating system for a vehicle, the system comprising:

an electric power system configured to be electrically connected to an electric traction motor of the vehicle and configured to receive and store electric power generated by the electric traction motor during braking, a fluid conduit, an air flow producing unit configured to provide a pressurized air flow through the fluid conduit, an electric machine, a transmission arrangement, wherein the electric machine is configured to be powered by the electric power system so as to drive the air flow producing unit via the transmission arrangement in order to dissipate energy from the electric machine, wherein the transmission arrangement comprises a first shaft and a second shaft, wherein the first shaft is connected to and configured to be driven by the electric machine and the second shaft is connected to and configured to drive the air flow producing unit, wherein the transmission arrangement is configured such that the second shaft rotates at higher speed than the first shaft, wherein said transmission arrangement has a variable transmission ratio.

2. The electric energy dissipating system of claim 1, wherein the transmission arrangement comprises a continuously variable transmission (CVT) for allowing seamless change of transmission ratios.

3. The electric energy dissipating system of claim 1, further comprising a throttle located at an air intake of the air flow producing unit, wherein the throttle is adjustable to control intake pressure of air entering the air flow producing unit, and thereby power of the air flow producing unit.

4. The electric energy dissipating system of claim 1, further comprising a control unit configured to control an amount of energy dissipated from the electric machine by controlling the electric power provided to the electric machine and/or by controlling the transmission ratio of the transmission arrangement and/or by controlling a flow-through area of a throttle.

5. The electric energy dissipating system of claim 4, wherein the electric power system comprises a battery for storing regenerated electric energy, wherein the control unit is configured to acquire information indicating a state of the battery, such as state of charge, temperature and/or power, wherein the control unit is configured to control the power provided to the electric machine and/or the transmission ratio of the transmission arrangement and/or the flow-through area of the throttle based on the acquired information indicating the state of the battery.

6. The electric energy dissipating system of claim 4, wherein the control unit is connected to the electric power system and the electric machine, wherein the control unit is configured to:

receive information indicating a brake request, and based on said received information indicating a brake request, control the electric power system to power the electric machine.

7. The electric energy dissipating system of claim 6, wherein the electric power system comprises an inverter which converts a DC input into an AC output, wherein the electric machine is electrically connected to the inverter, wherein the control unit is configured to, based on said information indicating a brake request, activate the inverter to provide power to the electric machine.

8. The electric energy dissipating system of claim 4, wherein the control unit is connected to the electric power system and the electric machine, wherein the control unit is configured to:

receive, from the electric power system, information indicating a current energy dissipation request from the electric power system, and based on said received information indicating a current energy dissipation request, control the electric power system to power the electric machine and/or control the transmission ratio of the transmission arrangement and/or control the flow-through area of the throttle.

9. The electric energy dissipating system of claim 8, wherein said current energy dissipation request is based on a desired energy level of the electric power system at an upcoming driving position for the vehicle, wherein before the vehicle arrives at the upcoming driving position, the control unit is configured to control the power provided to the electric machine and or control the transmission ratio of the transmission arrangement and/or control the flow-through area of the throttle.

10. The electric energy dissipating system of claim 4, wherein said electric traction motor is a first electric traction motor, wherein said electric machine is a second electric traction motor electrically connected to the electric power system, wherein upon braking of the vehicle, the second electric traction motor is configured to drive the air flow producing unit in order to dissipate at least a part of the electric energy that is generated by the first electric traction motor during the braking.

11. The electric energy dissipating system of claim 10, wherein both the first electric traction motor and the second electric traction motor are configured to be coupled to a vehicle gearbox to provide traction force to road wheels of the vehicle, wherein the control unit is configured to decouple the second electric traction motor from the vehicle gearbox and control the second electric traction motor to drive the air flow producing unit and thus dissipating at least part of the electric energy that is generated by the first electric traction motor which is still coupled to the vehicle gearbox.

12. The electric energy dissipating system of claim 1, wherein the air flow producing unit is an air compressor configured to compress received air and transmit the compressed air along the fluid conduit.

13. An electric energy dissipating system for a vehicle, the system comprising:

an electric power system configured to be electrically connected to an electric traction motor of the vehicle and configured to receive and store electric power generated by the electric traction motor during braking, a fluid conduit, an air flow producing unit configured to provide a pressurized air flow through the fluid conduit, an electric machine, a transmission arrangement, wherein the electric machine is configured to be powered by the electric power system so as to drive the air flow producing unit via the transmission arrangement in order to dissipate energy from the electric machine, wherein the transmission arrangement comprises a first shaft and a second shaft, wherein the first shaft is connected to and configured to be driven by the electric machine and the second shaft is connected to and configured to drive the air flow producing unit, wherein the transmission arrangement is configured such that the second shaft rotates at higher speed than the first shaft, wherein said transmission arrangement comprises a gearbox with gears for transmitting the rotation of the first shaft to a rotation of the second shaft.

14. The electric energy dissipating system of claim 13, wherein said gearbox comprises an intermediate shaft, wherein said first shaft is via a first gear connected to said intermediate shaft such that said intermediate shaft rotates at higher speed than said first shaft, wherein said intermediate shaft is via a second gear connected to said second shaft such that said second shaft rotates at higher speed than said intermediate shaft.

15. The electric energy dissipating system of claim 13, further comprising an oil pump configured to feed oil to the gears for lubricating and cooling the gears.

16. The electric energy dissipating system of claim 15, further comprising an oil circuit in which the oil fed by the oil pump is circulated, wherein the oil circuit comprises a heat exchanger arrangement located downstream of the gears, wherein oil heated by the gears becomes cooled when passing along the heat exchanger arrangement before being recirculated to the gears.

17. An electric energy dissipating system for a vehicle, the system comprising:

an electric power system configured to be electrically connected to an electric traction motor of the vehicle and configured to receive and store electric power generated by the electric traction motor during braking, a fluid conduit, an air flow producing unit configured to provide a pressurized air flow through the fluid conduit, an electric machine, a transmission arrangement, wherein the electric machine is configured to be powered by the electric power system so as to drive the air flow producing unit via the transmission arrangement in order to dissipate energy from the electric machine, wherein the transmission arrangement comprises a first shaft and a second shaft, wherein the first shaft is connected to and configured to be driven by the electric machine and the second shaft is connected to and configured to drive the air flow producing unit, wherein the transmission arrangement is configured such that the second shaft rotates at higher speed than the first shaft, wherein some of the air received by the air flow producing unit is also guided to the electric machine in order to cool the electric machine.

18. An electric energy dissipating system for a vehicle, the system comprising:

an electric power system configured to be electrically connected to an electric traction motor of the vehicle and configured to receive and store electric power generated by the electric traction motor during braking, a fluid conduit, an air flow producing unit configured to provide a pressurized air flow through the fluid conduit, an electric machine, a transmission arrangement, wherein the electric machine is configured to be powered by the electric power system so as to drive the air flow producing unit via the transmission arrangement in order to dissipate energy from the electric machine, wherein the transmission arrangement comprises a first shaft and a second shaft, wherein the first shaft is connected to and configured to be driven by the electric machine and the second shaft is connected to and configured to drive the air flow producing unit, wherein the transmission arrangement is configured such that the second shaft rotates at higher speed than the first shaft, wherein the air flow producing unit includes a liquid injector configured to inject liquid into the air flow in order to increase a mass flow of the pressurized air flow.

19. An electric energy dissipating system for a vehicle, the system comprising:

an electric power system configured to be electrically connected to an electric traction motor of the vehicle and configured to receive and store electric power generated by the electric traction motor during braking, a fluid conduit, an air flow producing unit configured to provide a pressurized air flow through the fluid conduit, an electric machine, a transmission arrangement, wherein the electric machine is configured to be powered by the electric power system so as to drive the air flow producing unit via the transmission arrangement in order to dissipate energy from the electric machine, wherein the transmission arrangement comprises a first shaft and a second shaft, wherein the first shaft is connected to and configured to be driven by the electric machine and the second shaft is connected to and configured to drive the air flow producing unit, wherein the transmission arrangement is configured such that the second shaft rotates at higher speed than the first shaft, wherein the electric machine and a gearbox are noise-insulated.

* * * * *